UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

PROCESS OF MAKING GREEN DYES.

SPECIFICATION forming part of Letters Patent No. 617,627, dated January 10, 1899.

Application filed December 27, 1897. Serial No. 663,725. (Specimens.)

*To all whom it may concern:*

Be it known that I, OSCAR BALLY, doctor of philosophy, a citizen of the Swiss Republic, residing at Mannheim, in the Grand Duchy of Baden, Empire of Germany, have invented new and useful Improvements in the Manufacture and Production of Green Mordant-Dyeing Coloring-Matters from Halogen-Substituted Fluoresceins, (for which patents were obtained in Germany April 13, 1897, No. 94,951, and in France June 14, 1897, No. 267,848,) of which the following is a specification.

It is known that by heating eosin with concentrated sulfuric acid to boiling traces of a mordant-dyeing coloring-matter are obtained, which is called "brom-coerulein." I have now discovered that by the addition of boracic acid to the melt a great quantity of a useful dyestuff is directly and smoothly produced, which dyestuff dyes chrome-mordanted wool fast green shades. A similar coloring-matter is produced on employing dibrom-fluorescein instead of eosin, (tetrabrom-fluorescein.)

The following examples will serve to illustrate the manner in which my invention can best be carried into practical effect. The parts are by weight.

Example 1: Thoroughly mix about ten (10) parts of dibrom-fluorescein with about ten (10) parts of boracic acid and pour it into about one hundred (100) parts of sulfuric acid of 66° Baumé. Stir and heat at two hundred and forty to two hundred and fifty degrees centigrade (240—250° C.) until the dibrom-fluorescein has disappeared. Cool the melt, pour it into water, filter off the precipitated dyestuff, and make it into a paste. When dried, the dyestuff is a dark-violet paste. In sodium carbonate and in caustic soda it dissolves with a bluish-green color. The concentrated sulfuric-acid solution is brownish red. The dyestuff is difficultly soluble in alcohol with a violet color. In water it is quite insoluble. It dyes chrome-mordanted wool in green shades.

Example 2: If in Example 1 tetrabrom-fluorescein be used in place of the dibrom-fluorescein, a dyestuff is produced in an analogous manner and which dyes chrome-mordanted wool green shades. When dried, the dyestuff is a dark-violet paste. The solution thereof in sodium carbonate is dirty blue, in caustic soda dirty bluish violet, in concentrated sulfuric acid (66° Baumé) cherry red, and in alcohol violet. It is insoluble in water.

Now what I claim is—

The process for the manufacture of a green mordant-dyeing coloring-matter which consists in melting together brom-fluoresceins and concentrated sulfuric acid and then adding boracic acid to the melt substantially as hereinbefore described.

In testimony whereof I have hereunto set my hand in the presence of two subscribing witnesses.

OSCAR BALLY.

Witnesses:
   GUSTAV L. LICHTENBERGER,
   BERNHARD C. HESSE.